United States Patent [19]

Hughes

[11] 3,887,634
[45] June 3, 1975

[54] LIQUID PHOSPHORIC ACID CATALYZED POLYMERIZATION PROCESS

[75] Inventor: Mack F. Hughes, Albany, Calif.

[73] Assignee: Chevron Research Company, San Francisco, Calif.

[22] Filed: Nov. 23, 1973

[21] Appl. No.: 418,631

[52] U.S. Cl. .................................. 260/683.15 C
[51] Int. Cl. .................................... C07c 3/16
[58] Field of Search ...................... 260/683.15 C

[56] References Cited
UNITED STATES PATENTS

| | | |
|---|---|---|
| 2,592,428 | 4/1952 | Kemp et al. ............... 260/683.15 C |
| 2,814,655 | 11/1957 | Langlois et al. ............ 260/683.15 C |
| 2,835,716 | 5/1958 | Langlois et al. ............ 260/683.15 C |

Primary Examiner—Paul M. Coughlan, Jr.
Attorney, Agent, or Firm—G. F. Magdeburger; John Stoner, Jr.; T. G. DeJonghe

[57] ABSTRACT

The length of time to activate a liquid phosphoric acid catalyst used in an olefin polymerization process is decreased by using a higher temperature during startup than during normal operation with the fully activated catalyst.

3 Claims, 1 Drawing Figure

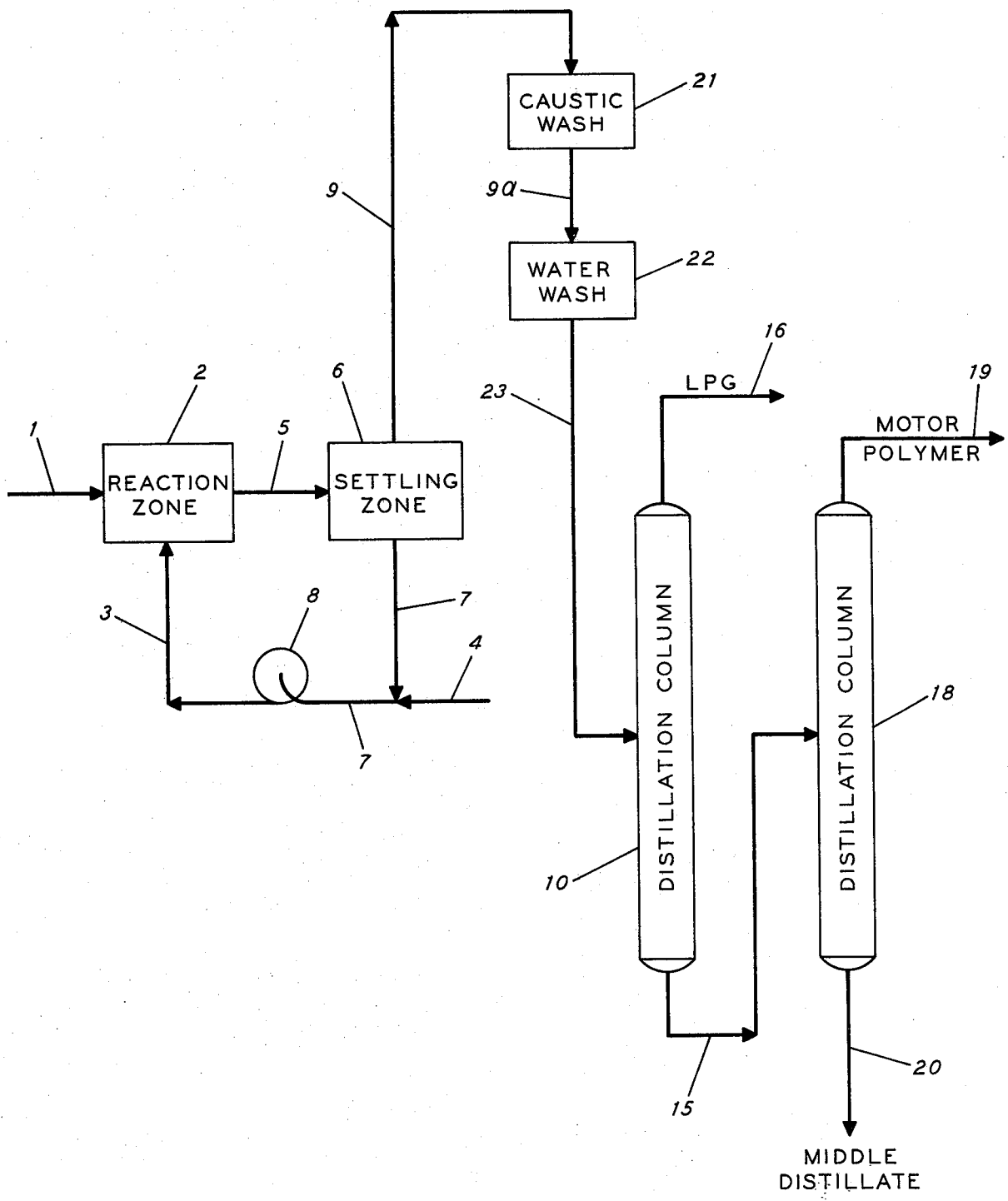

LIQUID PHOSPHORIC ACID CATALYZED POLYMERIZATION PROCESS

BACKGROUND OF THE INVENTION

The present invention relates to polymerization of propylene and/or butylene using a liquid phosphoric acid catalyst.

The use of liquid phosphoric acid in olefin polymerization is described in "Hydrocarbon Processing," September 1968, at page 169. The process can be used to produce motor gasolines using refinery propylene and/or butylene cuts or fractions. Precursors of synthetic detergents, for example propylene tetramer or pentamer, can also be produced by polymerization using the unsupported liquid phosphoric and acid catalyst.

Exemplary patents disclosing the use of a liquid-phase acid catalyst for polymerization of olefins include U.S. Pat. Nos. 2,843,639; 2,843,640; 2,843,641; 2,835,716; 2,826,622; and 2,814,655.

SUMMARY OF THE INVENTION

According to the present invention, an improvement is provided for the startup procedure in a polymerization process using a liquid phosphoric acid catalyst. The startup procedure results in a catalyst of high activity. Thus, in the startup of a process for polymerizing a feed of propylene, butylene, or mixtures thereof, by contacting the feed with a liquid phosphoric acid catalyst in a reaction zone at a temperature between about 200° and 350° F. and a pressure sufficient to maintain liquid phase, thereby obtaining a reaction zone effluent comprising hydrocarbons within the range of $C_6$–$C_{20}$ and phosphoric acid; removing the acid from the hydrocarbons in a settling zone; and returning the acid to the reaction zone, the improvement is made which comprises maintaining the reaction zone at a temperature of about 20° to 125° F. higher, during the first about 10 to 100 hours, preferably about 15 to 75 hours, of startup with fresh acid catalyst, than is normally maintained after the catalyst has attained full activity.

Among other factors, the present invention is based on my finding that a liquid phosphoric acid catalyst can be activated very rapidly by using a higher temperature during the first hours of startup than is to be used in normal operation; and furthermore that the yield distribution for the subsequent normal operation is not upset by use of the higher temperature during startup.

The term "startup" is used herein to refer to the commencement of operation of the polymerization plant with olefin feed to the reactor and recycle of a new charge of liquid phosphoric acid catalyst to the reactor or reaction zone. There may be, of course, preliminary operational steps prior to commencement of the startup. The term "full activity" is used herein to connote the activity of the phosphoric acid catalyst after it has reasonably steadied out to an approximately constant activity level in terms of percent conversion of olefin feed and yield of desired polymer products.

Prior art startup procedures for activation of the phosphoric acid catalyst usually cover a period of 2 to 6 weeks, during which time the reaction zone temperature would be held approximately constant at the same temperature as for normal operation. After the period of about 2 to 6 weeks, the catalyst would reach full — that is, substantially steady-state — activity. For example the yield of a detergent polymer may be 81 weight percent at the beginning of startup and reach about 85% after 2 weeks, and finally steady out at about 91–94 weight percent after 6 weeks. Thus, an additional advantage of the present invention is that the polymerization plant is more rapidly brought to steady-state conditions than under prior art startup procedures, as the weight percent yield of polymer product to be separated by fractionation can more rapidly be leveled out under the startup procedure of the present invention. In the process of the present invention, a higher-than-normal temperature is used during the first hours of startup, but after usually less than 2 to 4 days the temperature of the polymerization reaction zone can be steadied out at normal operation temperature, thus allowing the rest of the plant, particularly the fractionation section, to be steadied out.

In the process of the present invention, preferably the temperature in the reaction zone is maintained at about 250°–310° F., more preferably 265°–295° F., during the first 10–72 hours of startup and is normally maintained at about 190°–250° F., more preferably 220°–245° F., thereafter.

The catalyst used in the present invention is phosphoric acid, which term is used herein to connote $H_3PO_4$ or orthophosphoric acid. Forms of phosphoric acid include:

$P_2O_5 + H_2O = 2HPO_3$, metaphosphoric acid
$P_2O_5 + 2H_2O = H_4P_2O_7$, pyrophosphoric acid
$P_2O_5 + 3H_2O = 2H_3PO_4$, orthophosphoric acid The strength of the acid can be given in terms of percent $H_3PO_4$ — for example, as described in the article by Langois and Walkey appearing in "Petroleum Refiner," August 1952, pp. 79–83. In general, the higher percentages of $H_3PO_4$ correspond to less $H_2O$ and more $P_2O_5$. In the process of the present invention, preferably the acid is 110–125% $H_3PO_4$, more preferably about 112–120% $H_3PO_4$.

DRAWING

The drawing is a schematic process flow diagram illustrating a preferred embodiment of the present invention.

FURTHER DESCRIPTION OF THE DRAWING

Referring in more detail to the drawing, a light olefin feedstock containing propylene and butylene is introduced via line 1 to reaction zone 2. The feedstock may, for example, be obtained as a light fraction rich in olefins from a refinery catalytic cracking unit such as a fluid catalytic cracking unit. The feedstock may be obtained from other units, for example an ethylene production unit. If the feedstock contains contaminants such as COS, mercaptans, and/or nitrogen compounds, the feedstock should be pretreated as, for example, by caustic extraction, to remove these impurities and thus prevent possible harm to the phosphoric acid catalyst.

The reaction zone is maintained at elevated temperature and pressure, and acid is added to the reaction zone via line 3. Makeup acid is introduced to the system via line 4. The acid catalyst and the olefin feed are intimately contacted in reaction zone 2 to obtain the desired polymerization. The reaction zone can be, for example, a conventional vessel, a centrifugal pump, a section of pipe, etc., or a combination thereof. The temperature in the reaction zone can be maintained in the desired limits by the use of conventional heat-exchange equipment (not shown).

The product stream, including the catalyst, is continuously withdrawn from zone 2 through line 5 and is discharged into settling zone 6, wherein the respective hydrocarbon and acid components of said stream separate into upper and lower layers, respectively. In addition to product $C_6$–$C_{20}$ hydrocarbons, the effluent from the reaction zone typically also contains feed paraffins and unreacted olefins. The catalyst phase is withdrawn from the settler through line 7 and recycled via pump 8 and line 3 to zone 2, while the hydrocarbon phase is withdrawn through line 9, passed through caustic scrubber 21 and water washing zone 22, and is then introduced into distillation column 10 via line 23. Polymers boiling in the $C_6$–$C_{20}$ range are withdrawn from column 10 via line 15. It should be understood that the term "$C_6$–$C_{20}$ hydrocarbons" is used herein to include any hydrocarbon cuts or fractions within the range $C_6$ to $C_{20}$, such as a predominantly $C_{15}$ fraction, and not just to mean material boiling over essentially the entire range of $C_6$–$C_{20}$.

The gaseous and similar products and/or feedstock boiling below said range are taken overhead through line 16.

The $C_6$–$C_{20}$ hydrocarbons are passed via line 15 to topping column 18, where they are distilled to obtain, via line 19, an overhead motor polymer fraction boiling in the range 100° to 350° F. A middle-distillate fraction boiling in the range 350° to 550° F. is withdrawn via line 20 from the bottom of the topping column. The material removed via line 16, and boiling below 100° F., can be used as LPG.

An exemplary startup procedure is as follows: the reactor of reaction zone 2 is filled with an inert hydrocarbon having a boiling-point range about the same as that of the expected product(s). For example, product from a previous run or from another plant, naphtha, etc., are all useful for startup. This hydrocarbon is heated to the desired temperature, which would be the normal reaction temperature in prior art processes, but which is a higher temperature (activation temperature) in the improved process of this invention. Then phosphoric acid having the desired concentration of $H_3PO_4$ is slowly charged to the reactor via lines 4, 7 and 3. A mixture of acid and hydrocarbon then passes from reaction zone 2 to settling zone 6. The acid is recycled to the reactor via lines 7 and 3, along with fresh acid. The overflow hydrocarbon is removed from the settling zone via line 9 and is passed through caustic scrubber 21 and water washing zone 22, and is then fed to the distillation reactor where it is used to line out the distillation columns. Phosphoric acid is added until the desired ratio of hydrocarbon to phosphoric acid is reached in the reactor. Then feed olefin is charged through line 1 and the rate of addition is slowly brought up to design values. The original startup hydrocarbon charge is soon replaced by the product hydrocarbon in the reactor, the settler and in the distillation columns.

In the prior art startup procedure, the reaction was then allowed to continue. Under these conditions, the initial large quantity of low-boiling material, removed through line 16, gradually decreased, until after 2 to 6 weeks it reached a steady state. This decrease in column 10 overhead reflects a corresponding increase in conversion as the catalyst is slowly activated.

In the present improved process, typically the reaction is allowed to continue at the high activation temperature until the acid recycle stream (3) changes from black to red-brown, and from a density of 2.0 to about 1.4. This change usually requires from 1 to 3 days. Then the reaction zone temperature is lowered to the usual prior art reaction zone temperature.

EXAMPLES

A 1,200-ml reactor (overflow volume) was charged with 1,200 ml of a 50/50 mixture of motor polymer and middle distillate. This mixture was stirred and heated to 220° F. Then 850 g of 116% phosphoric acid was charged to the reactor. As the acid was carried over to the settler, it was recycled back to the reactor at 33 ml/min. The feed olefin (11% propane, 34% propylene, 26% butane and 29% butylenes) was also fed to the reactor at 33 ml/min. After 20 hours of operation under these conditions, the olefin conversion rate was 88% at an average residence time of 18 minutes. The product was 41% motor polymer and 59% middle distillate.

Then the temperature was raised to 275° F., and after 40 hours of operation the conversion had increased to 98% at an average residence time of 18 minutes. The product was 50/50 motor polymer and middle distillate.

After 70 hours at 275° F., the temperature was returned to 220° F. The olefin conversion remained high, at 96%, even at an 8-minute residence time (olefin feed and acid recycle rates of 75 ml/min. each). The product was 41% motor polymer and 59% middle distillate. The phosphoric acid catalyst maintained its high activity without diminution for the remainder of the run.

In another case, the same reaction was carried out under the same conditions, except that the temperature was maintained at 220° F. Even after several hundred hours of operation, the olefin conversion was in the range of 85 to 90% at an 8 minute residence time, indicating that the catalyst was not yet fully activated. After a period of about 6 weeks of operation at a temperature of 220° F., the catalyst would be expected to reach full activity of about 96% conversion.

What is claimed is:

1. In the startup of a process for polymerizing a feed of propylene, butylene, or mixtures thereof, by contacting the feed with a liquid phosphoric acid catalyst in a reaction zone at a temperature between about 200° and 350° F. and a pressure sufficient to maintain liquid phase, thereby obtaining a reaction zone effluent comprising hydrocarbons within the range of $C_6$ to $C_{20}$ and phosphoric acid; removing the acid from the hydrocarbons in a settling zone; and returning the acid to the reaction zone, the improvement which comprises maintaining the reaction zone at a temperature of about 20° to 125° F. higher, during the first 10 to 100 hours of startup with fresh acid catalyst, than is maintained in steady-state operation after the catalyst has attained full activity.

2. A process in accordance with claim 1 wherein the temperature in the reaction zone is maintained at about 265° to 295° F. during the first 10 to 100 hours of startup and is maintained during steady-state operation at about 220° to 245° thereafter.

3. A process in accordance with claim 1 wherein the catalyst is 110 to 125% phosphoric acid.

* * * * *